United States Patent Office 3,290,397
Patented Dec. 6, 1966

3,290,397
ADDITION OF ALLYLIC HALIDES TO OLEFINS AND HALO-OLEFINS
Frederick F. Rust, Orinda, and Harvey S. Klein, Berkeley, Calif., assignors to Shell Oil Company, New York, N.Y., a corporation of Delaware
No Drawing. Filed Nov. 27, 1963, Ser. No. 326,366
10 Claims. (Cl. 260—651)

This invention relates to an improved method for the production of certain halogen-containing organic compounds. More particularly, it relates to an improved process for the addition of allylic halides to compounds containing ethylenic unsaturation.

The reaction of allylic halides, i.e., compounds containing at least one halogen substituent on a carbon atom attached to one member of a carbon-carbon double bond, with ethylenically unsaturated compounds is known in the art. Due to the readily polymerizable character of such materials, these reactions are principally polymerization processes, and numerous examples of co-polymers of allylic halides, particularly allyl chloride, with other unsaturated molecules are known. Great difficulty is attendant to processes for the addition of allylic halides to unsaturates without extensive polymerization. For example, Klebanskii et al., Zhur. Obshchei Khim., 28, 881 (1958), report the reaction of 1,3-dichloro-2-butene with isoprene in the presence of a ferric chloride catalyst at 20° C. in the absence of solvent. The formation of a 1:1 addition product, i.e., a co-dimer, was reported, but the yield of such simple addition product was only about 2%. The remaining product was composed of polymer of various types.

It is the object of the present invention to provide an improved process for the production of certain unsaturated organic halides. More particularly, it is an object to provide an improved process for the addition of allylic halides to compounds containing ethylenic unsaturation.

It has now been found that these objects are accomplished by the process for the addition of allylic halides to compounds containing ethylenic unsaturation, in liquid-phase solution in inert solvent, in the presence of certain metallic compounds as catalyst, which process occurs without extensive formation of polymer.

The metallic compounds which have been found to be useful catalysts in the process of the invention are iron compounds, particularly iron salts comprising iron cations, either in the ferrous or ferric oxidation state, and simple anions, either organic or inorganic. Although iron compounds such as the acetate, nitrate, sulfate and the like are operable, best results are obtained when the catalyst employed is a halide, e.g., fluoride, chloride, bromide or iodide. Preferred are iron halides wherein the halogen has an atomic number from 17 to 35, that is, the middle halogens chlorine and bromine. Although in general the ferrous salts are preferred over the corresponding ferric salt, in most cases ferric salts give satisfactory results. Particularly preferred as catalyst for the process of the invention is ferrous chloride.

The allylic halide employed as reactant in the process of the invention possesses at least one halogen that is allylic to an ethylenic linkage, i.e., a non-aromatic carbon-carbon double bond. A particularly suitable class of such compounds has from 3 to 20 carbon atoms, has only the one ethylenic linkage present, which is the only carbon-carbon unsaturation in the molecule, and has from 1 to 2 allylic halogen atoms which are preferably located so that no more than one allylic halogen atom substituent is present on any one carbon atom. The allylic halide may be otherwise hydrocarbon or may be substituted with non-hydrocarbyl substituents, but when substituted hydrocarbon it is preferred that any non-hydrocarbyl substituents be halogen, particularly halogen of atomic number from 17 to 35.

The preferred class of allylic halides therefore contains only atoms of carbon, hydrogen and halogen and thus are hydrocarbon allylic halides or halohydrocarbon allylic halides, generically designated as halo(hydrocarbon) allylic halides. Such compounds are represented by the formula

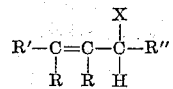

wherein X is halogen, preferably having an atomic number from 17 to 35, R is hydrogen, X or X-methyl, R' is R or alkyl having from 1 to 8 carbon atoms, preferably 1 to 4, and R" is hydrogen with the proviso that R' and R" may together form a divalent alkyl radical, i.e., an alkylene radical, having from 1 to 4 carbon atoms.

Illustrative of such compounds are allyl chloride, allyl bromide, crotyl chloride, 1,3-dichloropropene, 1,4-dichloro-2-butene, 3-chlorocyclopentene, 3-bromocyclohexene, 1-bromo-2-heptene, 3-chloro-2-chloromethylpropene, 1,2,3-trichloropropene, 1,3-dibromo-2-hexene, 1,3-dibromocyclohexene and the like. Preferred compounds of the above-depicted formula have from 3 to 5 carbon atoms and contain chlorine as the X substituent(s). Most preferred as reactants are those compounds having 3 carbon atoms, i.e., allyl chloride and chlorinated derivatives thereof.

The allylic halide is reacted with a compound possessing ethylenic unsaturation, i.e., at least one non-aromatic carbon-carbon double bond. For convenience, such compounds are termed olefins, which term as used herein includes mono-olefins and compounds with more than one ethylenic linkage including conjugated dienes. The olefin employed as reactant in the process of the invention has from 1 to 2 ethylenic linkages which may be conjugated or isolated, i.e., not conjugated with other non-aromatic unsaturation, contains a total of from 2 to 20 carbon atoms, preferably from 2 to 10, and preferably contains no acetylenic unsaturation. The olefinic reactant may be hydrocarbon, that is, contain only atoms of carbon and hydrogen, or may be substituted hydrocarbon containing non-hydrocarbyl substituents which are inert under the conditions of the reaction. When such non-hydrocarbyl substituents are present, it is preferred that they are halogen, particularly halogen having an atomic number of from 17 to 35. Preferred olefinic reactants, which may be mono-olefin, di-olefin, i.e., a compound containing two non-conjugated carbon-carbon double bonds, or conjugated diene, therefore contain only atoms of carbon, hydrogen and halogen, and are hydrocarbon olefins or halohydrocarbon olefins, generically designated as (halo)hydrocarbon olefins.

Illustrative of such olefinic reactants are mono-olefins, including cyclic mono-olefins, such as ethylene, propylene, 1-butene, isobutene, 1-hexene, 2-heptene, cyclohexene, cyclooctene, 4-chloro-1-butene, allylbenzene, allyl chloride, 2-bromo-1-butene, allyl bromide, 4-chlorocyclohexene, 3-bromocyclopentene, styrene and 3,4-dichloro-2-methyl-1-butene; di-olefins including acyclic di-olefins such as biallyl, 1,4-pentadiene, divinylbenzene, 1,7-octadiene and 4-chloro-2,5-hexadiene, as well as cyclic di olefins such as 1,4-cyclohexadiene, 1,5-cyclooctadiene and 3-bromo-1,4-cycloheptadiene; and conjugated dienes such as butadiene, isoprene, chloroprene, 1,3-hexadiene, 2,3-dichloro-1,3-butadiene, cyclopentadiene and 4-bromo-1,3-cyclohexadiene. In general, acyclic olefins are preferred over analogous cyclic olefins, olefin reactants containing at least one terminal olefinic linkage are preferred over those compounds wherein all olefinic linkages are internal, and conjugated dienes are preferred over mono- or di-olefins. Most preferred as the olefinic reactant is butadiene.

The most suitable molar ratio of allylic halide to olefinic reactant employed will in part depend upon the functionality of the reactants, that is, the number of allylic halogen atoms present in the allylic halide, or the number of unsaturated reaction sites, i.e., ethylenic double bonds or conjugated diene moieties, present in the olefinic reactant, as it is within the contemplated scope of the invention to combine reactant molecules in a ratio determined by the number of reactive groups present. For example, one molecule of allylic halide possessing two allylic halogen atoms may react with two molecules of mono-functional olefinic reactant. In general, molar ratios of allylic halogen atom to ethylenic linkage from about 2:1 to about 1:2 are satisfactory, although advantageous use is frequently made of molar ratios that are substantially stoichiometric, that is, a molar ratio of allylic halogen atom to unsaturated reaction site that is substantially 1:1.

The iron compound is employed in catalytic amounts. While the optimum amount of catalyst will depend upon the particular allylic halide, olefinic reactant and iron compound employed, amounts of catalyst from about 0.005 mole to about 0.5 mole per mole of limiting reactant are generally satisfactory, while amounts of catalyst from about 0.05 mole to about 0.2 mole per mole of limiting reactant are preferred.

The process of the invention is conducted in liquid-phase solution in an inert solvent. Solvents that are suitable are liquid at reaction temperature and pressure, are capable of dissolving the reactants and are substantially inert toward the allylic halide and olefin reactants and the products produced therefrom. Preferred solvents are polar, that is, contain uneven charge distribution, and include such solvents as the alcohols, particularly lower monohydric and polyhydric alkanols such as methanol, ethanol, sec-butanol, tert-butanol, 2-ethylhexanol, glycerol, ethylene glycol and 1,2,6-hexanetriol as well as ether-alcohols such as the cellosolves and the carbitols; the lower alkyl nitriles such as acetonitrile, propionitrile and butyronitrile; esters such as methyl acetate, ethyl propionate and propyl butyrate; sulfones such as diethyl sulfone, propyl hexyl sulfone and sulfolane; and N,N-dialkylamides such as dimethylformamide and N,N-diethylacetamide. Most satisfactory solvents comprise the nitriles, especially the cyanoalkanes, and particularly preferred as reaction solvent is acetonitrile.

The solvent is employed in molar amounts equivalent to or in excess over either reactant. While a large excess of solvent does not appear to be overly detrimental, molar ratios of solvent to limiting reactant from about 1:1 to about 20:1 are preferred.

The reaction process is conducted at atmospheric, subatmospheric or superatmospheric pressure, so long as the reactants are maintained in the liquid phase. Advantageous use is frequently made of the pressures generated when the reaction mixture is heated to reaction temperature in a sealed reaction vessel, which pressures will be somewhat but not substantially greater than atmospheric pressure. Suitable reaction temperatures for the process of the invention vary from about 75° C. to about 200° C., although temperatures from about 80° C. to about 160° C. are preferred.

The process of the invention is conducted by mixing the reactants, catalyst and solvent and maintaining the reaction mixture at the desired temperature until reaction is complete. The method of mixing is not material. One reactant may be added to the other in increments, although it is equivalently useful to initially mix the entire amount of reactants. Subsequent to reaction, the product mixture is separated by conventional means such as by fractional distillation, selective extraction or crystallization.

The products of the process of the invention are unsaturated organic halides illustratively produced by cleavage of the bond between the allylic halogen and the carbon atom to which it was attached and the addition of the moieties thereby produced to the unsaturated reactant. When the unsaturated reaction site is mono-olefinic, addition occurs in a 1,2 manner as is illustrated by the following equation.

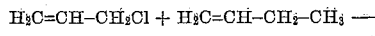
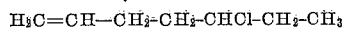

When the unsaturated reaction site is a conjugated diene, the possibility exists for both 1,2 and 1,4 addition. Although the predominant mode of addition is 1,4 and in many instances exclusively 1,4 addition takes place, on occasion both types of addition product are observed. Illustrative of this type of reaction is the following equation.

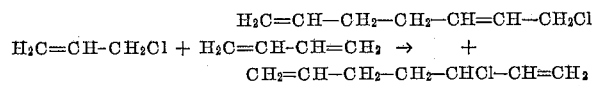

Other illustrative products are 7-bromo-5-methyl-1,5-heptadiene produced from allyl bromide and isoprene, 5-chloro-1-nonene produced from allyl chloride and 1-hexene, 5,8-dichloro-1,11-dodecadiene produced from two molecules of allyl chloride and one molecule of biallyl, 5,6-dichloro-1-hexene produced from reaction of allyl chloride with itself, 1,5-dichloro-1-heptene produced from 1,3-dichloropropene and 1-butene, and 1-crotyl-2-chlorocyclohexane produced from crotylchloride and cyclohexene.

The products of the process of the invention find utility as chemical intermediates. Due to the variety and number of functional groups present, a number of useful products can be prepared therefrom. The products of the invention contain ethylenic unsaturation which may serve as a reactive site for polymerization, or alternatively the ethylenic double bonds may be epoxidized to form useful epoxy resin precursors. The halogen atoms present may be reacted with tertiary amines to form useful quaternary ammonium salts, with sodium hydrosulfide to form the corresponding mercaptans, with metal carboxylates to form esters or with alkoxides or phenoxides to form ethers. Additionally, the ethylenic linkages may be catalytically hydrogenated to produce useful saturated alkyl halides.

To further illustrate the process of the invention, the following examples are provided. It should be understood that they are not to be regarded as limitations, as the teachings thereof may be varied as will be understood by one skilled in this art.

*Example I*

To a glass tube was charged 2 g. of 1,3-dichloropropene, 1 g. of butadiene, 3 ml. of acetonitrile and 0.15 g. of ferrous chloride. The tube was sealed and the contents maintained at 95° C. for a period of about 17 hours. The product mixture was removed, washed with water and dried. Gas-liquid chromatographic analysis of the product mixture indicated an approximately 50% yield, based upon a 20% conversion, of 1,7-dichloro-1,5-heptadiene, B.P. 210° C., $n_D^{25}$ 1.4909. The nuclear magnetic resonance spectrum was consistent with the above structure.

*Example II*

By the procedure of Example I, 6.6 g. of allyl chloride was heated with 4.3 g. of butadiene in 15 ml. of acetonitrile in the presence of 0.5 g. ferrous chloride at 110° C. for 18 hours. Gas-liquid chromatographic analysis indicated that two addition products were formed. One of these, the 1,2 addition product 3-chloro-1,6-heptadiene, B.P. 146° C., was obtained in 15% yield based upon a 45% conversion. The nmr spectrum was consistent with the above structure. The other product, the 1,4 addition product 1-chloro-2,6-heptadiene, B.P. 142° C., was obtained in 32% yield based upon the same conversion. The nmr spectrum was consistent with the above structure.

|               | Anal. Calc. | Found |
|---------------|-------------|-------|
| C, percent wt | 64.6        | 64.4  |
| H, percent wt | 8.5         | 8.6   |

*Example III*

To a glass tube was charged 2.8 g. of allyl chloride, 0.3 g. of ferrous chloride, and 3 ml. of acetonitrile. The tube was sealed and maintained at 140° C. for 17 hours. The product mixture was removed, washed with water and dried. Gas-liquid chromatographic analysis of the product, 5,6-dichloro-1-hexene, B.P. 168° C., $n_D^{25}$ 1.4630, indicated an 85% yield based upon a conversion of 8%. The nmr spectrum was consistent with the above structure.

The same product was obtained using ferric chloride as the catalyst and also when a ferric chloride catalyst and dimethylformamide solvent were employed.

*Example IV*

When 1,4-dichloro-2-butene is reacted with 1-butene in the presence of ferrous chloride and in acetonitrile solution, a good yield of 3,10-dichloro-6-dodecene is obtained.

*Example V*

When crotyl chloride is reacted with chloroprene in ethyl acetate solution in the presence of ferrous chloride, a good yield of 1,3-dichloro-2,6-heptadiene is obtained.

*Example VI*

When 3-bromocyclopentene is added to 1-pentene in acetonitrile solution in the presence of ferrous bromide, a good yield of 3-(2-bromopentyl)cyclopentene is obtained.

We claim as our invention:

1. The process for the addition of (a) an allylic halide reactant containing one ethylenic linkage, from 1 to 2 allylic halogen atoms of atomic number from 17 to 35 and from 3 to 20 carbon atoms, selected from hydrocarbon allylic halide reactants and halohydrocarbon allylic halide reactants wherein each halogen is halogen of atomic number from 17 to 35, to (b) an olefinic compound having from 2 to 20 carbon atoms and from 1 to 2 ethylenic linkages, selected from hydrocarbon olefin and halohydrocarbon olefin wherein each halogen, is halogen of atomic number from 17 to 35, in liquid-phase solution in a cyanoalkane solvent, the molar ratio of solvent to limiting reactant being from about 1:1 to about 20:1, at a temperature from about 75° C. to about 200° C., in the presence of a catalytic amount of ferrous halide as catalyst.

2. The process of claim 1 wherein the allylic halide reactant contains from 3 to 5 carbon atoms.

3. The process for the addition of (a) allyl halide wherein the halogen has an atomic number from 17 to 35 to (b) an olefinic compound having from 2 to 10 carbon atoms and from 1 to 2 ethylenic linkages, selected from hydrocarbon olefin and halohydrocarbon olefin wherein each halogen is halogen of atomic number from 17 to 35, in liquid phase solution in a cyanoalkane solvent, the molar ratio of said solvent to limiting reactant being from about 1:1 to about 20:1, at a temperature from about 75° C. to about 200° C., in the presence of a catalytic amount of ferrous halide as catalyst.

4. The process of claim 3 wherein the allyl halide is allyl chloride and the ferrous halide catalyst is ferrous chloride.

5. The process of claim 4 wherein the olefinic compound is a conjugated diene.

6. The process of claim 4 wherein the olefinic compound is butadiene.

7. The process of claim 4 wherein the olefin is styrene.

8. The process of claim 4 wherein the olefin is allyl chloride.

9. The process for the addition of (a) 1,3-dichloropropene to (b) an olefinic compound having from 2 to 10 carbon atoms and from 1 to 2 ethylenic linkages, selected from hydrocarbon olefin and halohydrocarbon olefin wherein each halogen is halogen of atomic number from 17 to 35, in liquid-phase solution in a cyanoalkane solvent, the molar ratio of solvent to limiting reactant being from about 1:1 to about 20:1, at a temperature from about 75° C to about 200° C., in the presence of a catalytic amount of ferrous chloride as catalyst.

10. The process of claim 9 wherein the olefin is butadiene.

References Cited by the Examiner
UNITED STATES PATENTS 2,426,913  9/1947  Adelson et al. _____ 260—654 X
2,714,619  8/1955  Anderegg et al. _____ 260—654

BERNARD HELFIN, *Primary Examiner.*

LEON ZITVER, *Examiner.*

K. V. ROCKEY, *Assistant Examiner.*